United States Patent

[11] 3,578,245

[72] Inventor Glover B. Brock
    3709 8th St. South, Arlington, Va. 22204
[21] Appl. No. 845,740
[22] Filed July 29, 1969
[45] Patented May 11, 1971

[54] ELECTRICALLY CONTROLLED FLUID DISTRIBUTION SYSTEM
    17 Claims, 3 Drawing Figs.
[52] U.S. Cl. .................................................. 239/66, 239/69
[51] Int. Cl. .................................................. A01g 25/02
[50] Field of Search ............................................ 239/66, 67, 69, 70; 251/129, 131; 431/86; 137/624.11

[56] References Cited
UNITED STATES PATENTS
3,420,270  1/1969  Neyer ........................... 239/66X Primary Examiner—M. Henson Wood, Jr.
Assistant Examiner—Edwin D. Grant
Attorney—Diller, Brown, Ramik & Holt ABSTRACT: A fluid distribution system is shown which includes a plurality of electrically actuated valves. Each valve is associated with a selectively activated switching device responsive to a particular control signal of preselected frequency. A band-pass filter is connected between each switching device and a source of control signals having differing frequencies and preselected durations for activating the switching devices. The source of control signals may be a source of prerecorded signals, such as a replacable cassette, or a preprogrammed oscillator arrangement.

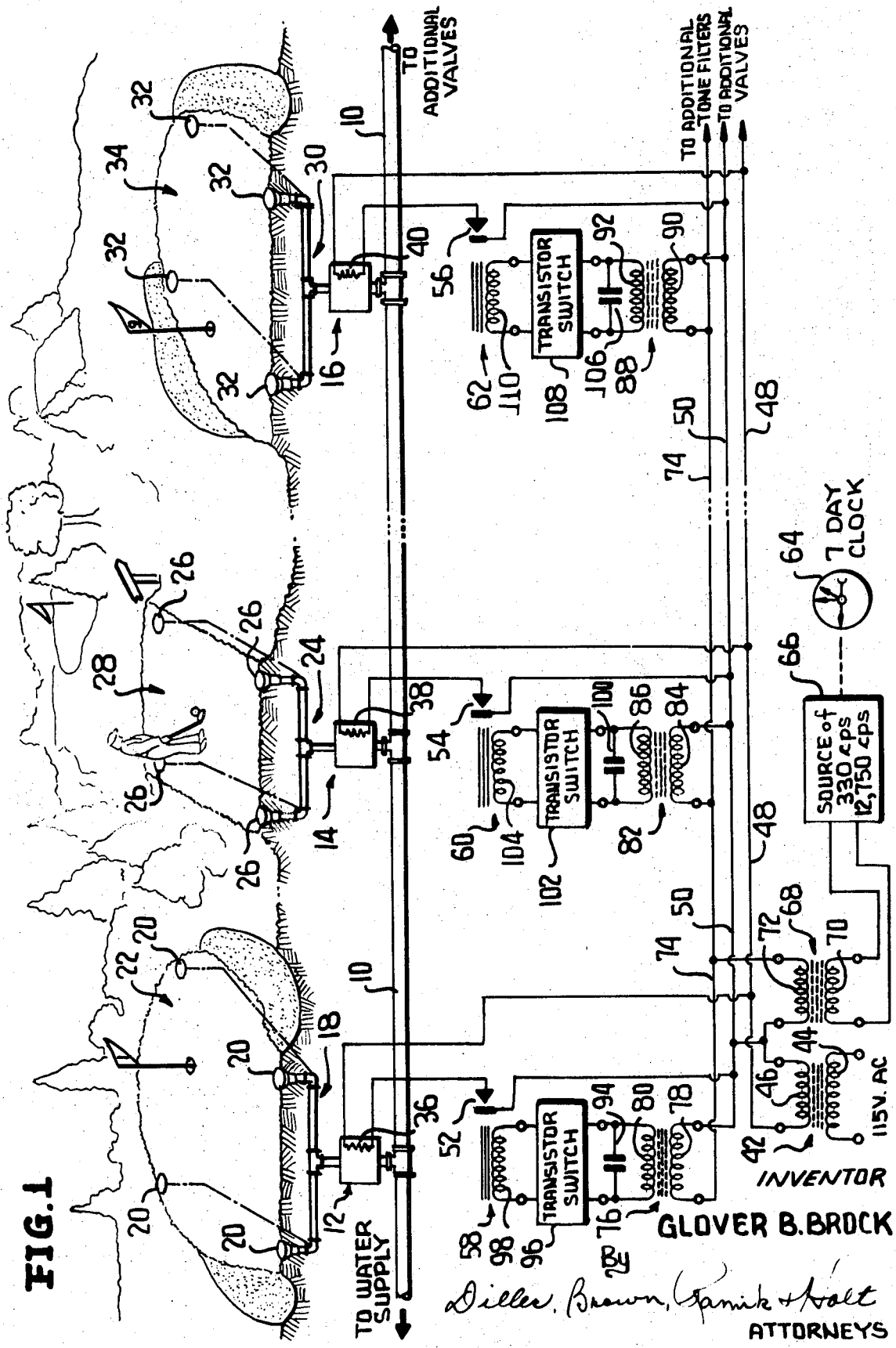

Patented May 11, 1971
3,578,245
2 Sheets-Sheet 2
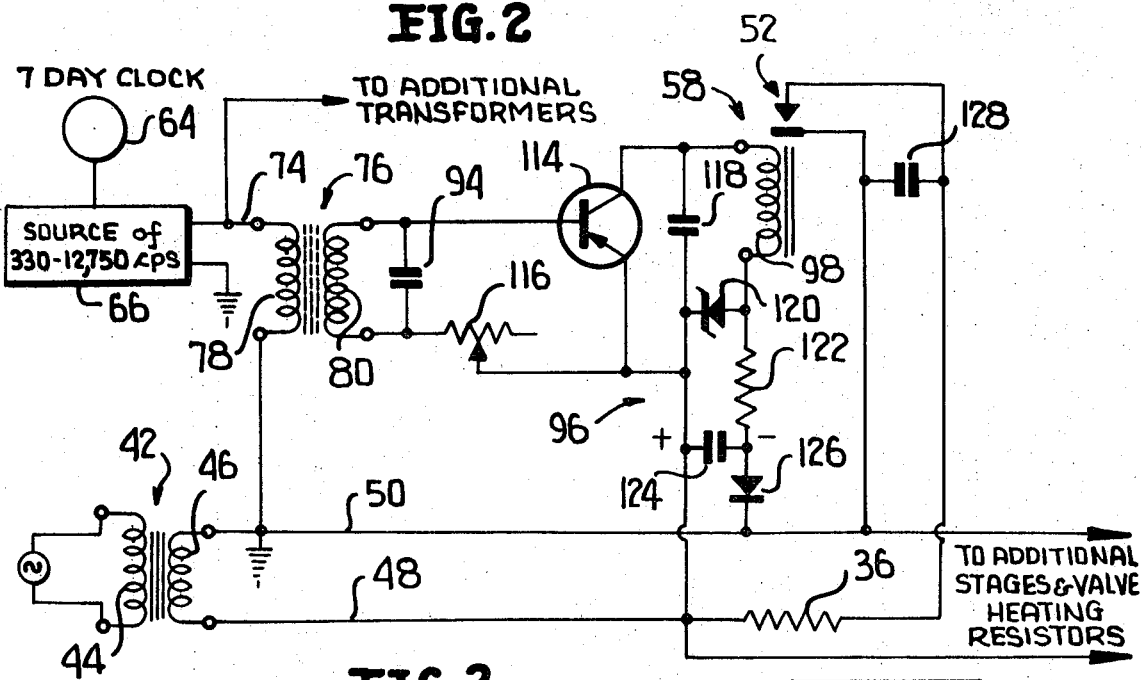
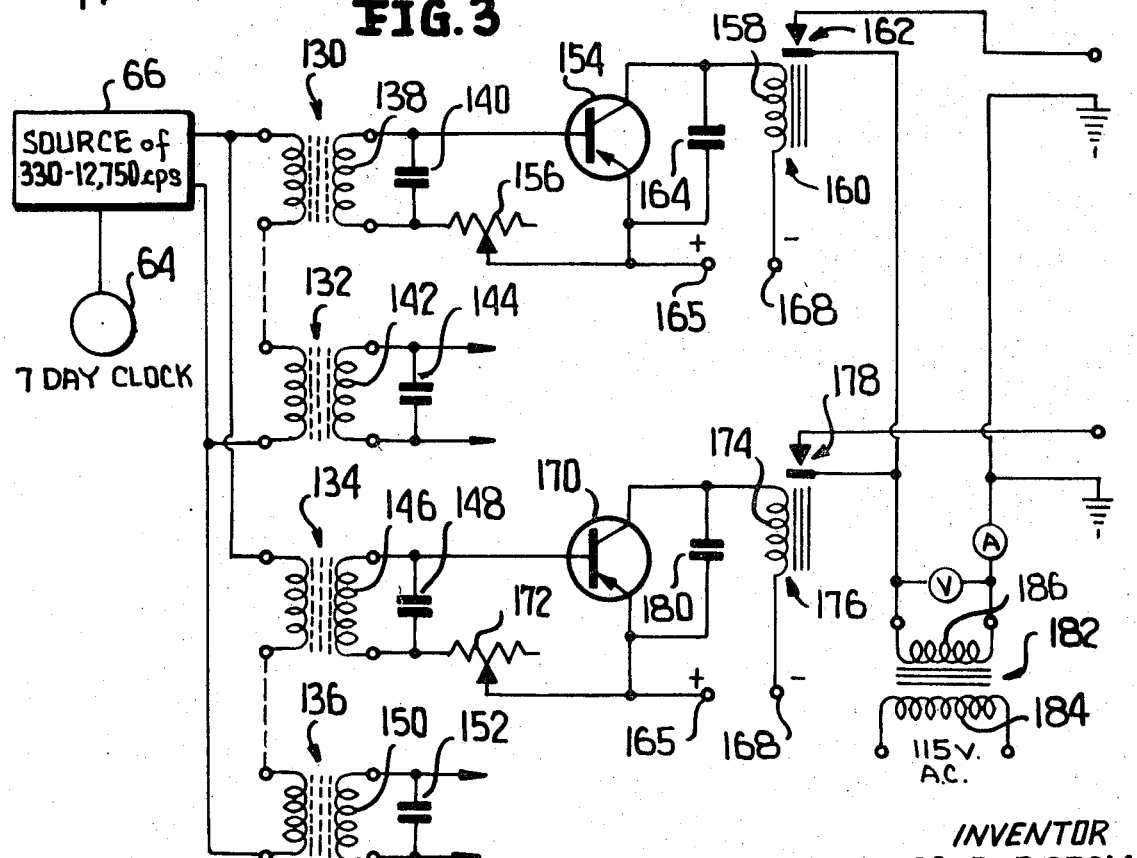
INVENTOR
GLOVER B. BROCK
By
Diller, Brown, Ramik & Holt
ATTORNEYS

ELECTRICALLY CONTROLLED FLUID DISTRIBUTION SYSTEM

This invention relates to electrically controlled fluid distribution systems and, more particularly, to electrically controlled irrigation and sprinkler systems.

In many sprinkler and irrigation environments, only a limited rate of water consumption is possible either because of a limited volume of supply, such as from a well, or the use of relatively small water conduits in order to reduce expense in connection with installing the sprinkler and irrigation system. It is for these reasons, that it is often desirable or necessary to provide irrigation and sprinkler systems in which only a limited number of valves are energized at any given time and in many instances only one at a time.

Numerous proposals have been made for providing automatically controlled fluid distribution systems for irrigation purposes and the like which use electric or hydraulic valve controls. In one prior art arrangement, an automatic sprinkler system for golf courses is provided with a controller for the purpose of selectively and sequentially energizing a number of remotely positioned valves which in turn may feed a number of rotor popup sprinklers. The controller is provided with a station timer for each valve. The station timer may be individually set to time control valve operation of each valve. In addition to the timers, starting time selector switches are provided so that a watering cycle may be started at any desired time of the day or night. It will be appreciated, that the need for separately setting each station timer and the time selector switches whenever a program change is desired is a relatively tedious process and may result in operator error.

It is an object of the invention to provide a fluid distribution system which avoids the need for a plurality of station timers and starting time selector switches while providing for a highly flexible distribution program.

It is another object of the invention to provide a fluid distribution system which utilizes a plurality of control signals of differing frequency and frequency selective means which control switching devices arranged to actuate electrically controlled valves.

It is a further object of the invention to provide a fluid distribution system which utilizes a plurality of control signals from a source of recorded signals.

It is yet another object of the invention to provide a fluid distribution system which utilizes a replaceable recording as a source of control signals of different frequencies and selected time durations.

It is still another object of the present invention to provide a fluid distribution system which utilizes frequency selective filters associated with remotely positioned valves in the proximity thereof and in which control signals of different frequencies are fed to the filters at least partially over the conductive means which supplies energization to the remotely positioned valves.

Additional objects, the features and nature of the invention and the advantages thereof will become apparent by reference to the detailed description of illustrated embodiments, the appended claims and the accompanying drawing, in which:

FIG. 1 shows a golf course sprinkler system which includes electrically actuated valves and a schematically illustrated electrical control circuit for the valves, FIG. 2 is a schematic diagram of a portion of the control circuit utilized in the golf course sprinkler system shown in FIG. 1 with the details of a transistor switch illustrated, FIG. 3 is a schematic diagram of an alternative control circuit which may be utilized in a modification of the golf course sprinkler system illustrated in FIG. 1.

Turning to FIG. 1, a portion of a golf course is illustrated pictorally showing portions of a sprinkler system for sprinkling greens and tees. As illustrated, the system includes a water conduit 10 coupled to a water supply, not shown, which may be, for example, a water tank, well or a public water main. A plurality of electrically controlled valves 12, 14 and 16 are coupled to the conduit 10. Although only three electrically controlled valves are illustrated specifically in FIG. 1 for the purpose of simplifying the illustration, it is to be understood that the distribution system may be associated with as many electrically controlled valves as desired. For example, a typical nine hole golf course could include at least 22 separate electrically controlled valves one for each tee and one for each green including a practice green and practice tee. It is further to be understood, that additional valves could be associated with the fairways of the golf course.

The electrically controlled valve 12 is coupled to a conduit system 18 which, in turn, is coupled to a plurality of popup sprinklers 20 associated with a green 22. In a similar fashion, the electrically controlled valve 14 is coupled to a conduit system 24 which, in turn, is coupled to a plurality of popup sprinklers 26 associated with a tee 28. The electrically controlled valve 16, is similarly coupled to a conduit system 30 which, in turn, is coupled to popup sprinklers 32 associated with green 34. The valves 12, 14 and 16 are preferably placed in close proximity to the green 22, the tee 28 and the green 34, respectively.

The electrically controlled valves 12, 14 and 16 are preferably of the slow opening and closing type. One such type valve arrangement suitable for use in systems utilizing the present invention, is of the thermal-motor actuated type in which each valve arrangement is provided with a heating resistor which slowly heats hydrocarbon material within the motor, causing a motor pin to push slowly a valve disc off a valve seat, thus slowly operating the valve and thereby avoiding undesirable transient pressure waves within the fluid distribution system. As illustrated, each of the electrically actuated valve 12, 14 and 16 is of the thermal-motor type, and is provided respectively with heating resistors 36, 38, and 40. It is to be understood, however, that while the thermal-motor-type valves are utilized for purposes of illustration and are preferred in many practical situations, the present invention is also equally applicable to systems using directly energized solenoid valves, electrically controlled, hydraulically energized valves and other types.

Power for supplying heating resistors 36, 38 and 40 with current is provided by a stepdown transformer 42 having its primary winding 44 connected to a source of 115 volts AC and its secondary winding 46 arranged to stepdown the voltage to approximately 24 volts. The secondary winding 46 is connected across conductors 48 and 50. Conductor 48, in turn, is connected directly to one side of each of the heating resistors used in the system including the illustrated heating resistors 36, 38 and 40. The other side of each of the heating resistors 36, 38 and 40 is respectively coupled to conductor 50 via pairs of contacts 52, 54 and 56 associated respectively with relays 58, 60 and 62.

A control arrangement for the aforementioned relays is provided which includes a 7-day clock 64 coupled in controlling relationship to a source of control signals 66 in the range from about 330 c.p.s. to about 12,750 c.p.s. The source 66, which may be a means for reproducing recorded signals, is preferably a removable cassette associated with a playback head, not shown, having its output coupled to a primary 70 of a transformer 68. It is to be understood, while the source 66 preferably is a removable recording having control signals of differing frequencies sequentially recorded thereon, in accordance with a desired program, the source 66 could be, if desired, one or more oscillators directly controlled by the 7-day clock 64 for providing the control signals. A secondary 72 of transformer 68 is connected across conductor 50 and conductor 74 for providing a path for control signals to each of the valve stations which are to be controlled by the system. Only three valve stations, as pointed out above, are shown for purposes of simplifying the illustration of the fluid distribution system of the invention.

As shown, conductors 50 and 74 are connected across a primary winding 78, a primary winding 84, and a primary winding 90 associated respectively with transformers 76, 82, and 88. A secondary winding 80 of the transformer 76 is provided with a tuning capacitor 94 so as to form a filter tuned to a selected frequency between about 330 c.p.s. to about 12,750 c.p.s. A transistor switch 96 has its input coupled across capacitor 94. The output of transistor switch 96 is connected in series with a relay winding 98 of relay 58. In a similar fashion, a secondary winding 86 of transformer 82 is provided with a capacitor 100 connected thereacross to form a tuned filter tuned to a different selected frequency between about 330 c.p.s. to about 12,750 c.p.s. A transistor switch 102 has its input coupled across capacitor 100, and its output connected in series with winding 104 of relay 60. A secondary winding 92 of transformer 88 is connected in parallel with capacitor 106 so as to provide a third tuned filter tuned to a different selected frequency in the range from about 330 c.p.s. to about 12,750 c.p.s. A transistor switch 108 has its input connected across capacitor 106, and its output connected in series with winding 110 of relay 62.

In FIG. 2, a portion of the circuit utilized in the golf course sprinkler system illustrated in FIG. 1 is shown with the details of the transistor switch 96 and a power supply therefor illustrated in detail with like reference numerals designating like parts. A power supply for the transistor switch 96 includes the stepdown transformer 42 having its primary 44 connected to a source of power, and its secondary 46 connected across the conductors 48 and 50 to supply approximately 24 volts AC thereto. The transistor switch 96 includes a transistor 114 having its emitter directly connected to the conductor 48. A rectifying diode 126 and a smoothing capacitor 124 are connected in series across the conductors 48 and 50 to provide a DC voltage between the emitter and collector of transistor 114. One electrode of the diode 126 is connected to the collector of the transistor 114 via a series connection including a series connected resistor 122 and the relay winding 98 of the relay 58. A zener diode 120 and capacitor 118 are connected across the relay winding 98. The emitter of the transistor 114 is connected to a slider on a rheostat 116 having an end thereof connected to the base of the transistor 114 via the secondary winding 80 of the transformer 76. Control signals of different frequencies from the source 66 are coupled to the primary 78 of the transformer 76. The source 66 is controlled by the 7-day clock 64. Heating resistor 36 is connected across the conductors 48 and 50 via the contacts 52 of the relay 58. A capacitor 128 is connected across the contacts 52 to reduce sparking therebetween. It is to be understood, that the 7-day clock 64, the source of different frequency signals 66 and the transformer 42 are positioned physically remote from the remainder of the elements illustrated in FIG. 2 which are all positioned in proximity to the valve 12 shown in FIG. 1.

In FIG. 3 an alternative control circuit is illustrated, in part, which may be utilized in a modification of the golf course sprinkler system shown in FIG. 1. The control circuit illustrated in FIG. 3 is especially adapted for use in a modified version of the system shown in FIG. 1 in which all of the transistor switches are positioned remote from the electrically actuated valves and the heating resistors associated with the thermal-motors forming part of the electrically actuated valves. The control arrangement shown in FIG. 3 includes the source of control signals 66 controlled by a 7-day clock 64. The output of the source of control signals 66 is connected to the primaries of a plurality of transformers 130—136. While only four transformers are illustrated, it is to be understood that a separate transformer is utilized for each valve station to be controlled. The dotted line which interconnects the primary windings of the transformers 130 and 132 is intended to diagrammatically illustrate that additional primary windings are also series connected. In a similar fashion, the dotted line interconnecting the primary windings of the transformers 134 and 136 is intended to illustrate that additional primary windings may be series connected. Each of the transformers 130 through 136 is provided with a secondary winding 138, 142, 146 and 150, respectively. The secondary winding 138 of the transformer 130 is provided with a tuning capacitor 140 so as to form a filter tuned to a selected frequency from about 330 c.p.s. to about 12,750 c.p.s. In a similar fashion, the secondary winding 142 of the transformer 132 is provided with a tuning capacitor 144, the secondary winding 146 of the transformer 134 is provided with a tuning capacitor 148, and the secondary winding 150 of the transformer 136 is provided with a tuning capacitor 152. The filters formed by the various tuned secondaries of the transformers 130 through 136 are each tuned to a different frequency within the frequency range of the control signal source 66. The base of a transistor 154 is connected to one plate of the capacitor 140, the other plate being connected to the emitter of the transistor 154 via a series connected rheostat 156. The collector of the transistor 154 is connected to a supply voltage terminal 168 via a relay winding 158 of a relay 160. The relay 160 is provided with a pair of contacts 162 which, in a closed condition, supply current to a heating resistor, not shown, corresponding to the heating resistor 36 illustrated as forming part of electrically actuated valve 12 in FIG. 1. One of the contacts 162 is connected to one end of a secondary winding 186 of a stepdown transformer 182 having its primary winding 184 connected to a source of 115 volts AC. The other end of secondary winding 186 is connected to a conductor illustrated as being grounded forming part of a power transmission system to remotely positioned thermal resistors corresponding to the thermal resistors 36, 38 and 40 shown in FIG. 1 and others. A capacitor 164 is connected between the collector and the emitter of the transistor 154 to provide protection for the transistor from high transient currents and to keep the relay 160 energized on alternate half cycles.

A transistor 170 is provided which has its base electrode connected to one end of secondary winding 146 which, in turn, is connected via rheostat 172 to the emitter of the transistor 170. The collector of the transistor 170 is connected to the first terminal 168 of a suitable power supply via a winding 174 of a relay 176. The relay 176 is provided with a pair of contacts 178 one of which is connected to one end of the secondary winding 186 of the stepdown transformer 182. The other end of the secondary winding 186 is connected to a conductor indicated as being ground. A heating resistor, now shown, corresponding to a heating resistor such as 40 shown in FIG. 1, is provided with power by being connected between the illustrated grounded conductor and the uppermost contact of relay 176. A capacitor 180 is connected between the collector and the emitter of the transistor 170 to provide protection for the emitter-collector current path of the transistor 170 against high transient currents and to keep the relay 176 energized on alternate half cycles.

In order to place the fluid distribution system illustrated in FIG. 1 and FIG. 2 in operation, conduit 10 is charged with water thereby supplying water to all of the valves of the system, including the electrically actuated valves 12, 14 and 16. Power for operating all of the transistor switches of the system, including the transistor switches 96, 102 and 108, and all of the electrically actuated valves, including valves 12, 14 and 16, is provided by energizing the transformer 42 thereby providing between the conductors 48 and 50, approximately 24 volts AC for energizing the heating resistors 36, 38 and 40 as well as additional heating resistors not shown. As illustrated, the 24 volts AC appear across the relay contacts 52, 54 and 56 as well as additional contacts associated with other relays which are not shown.

With particular reference to FIG. 2, it can be seen that the 24 volts AC appearing across the conductors 48 and 50 are utilized to provide suitable DC voltages for the collector and the emitter of the transistor 114 by way of the rectifying diode 126 and the smoothing capacitor 124. Approximately 24 volts DC appear across the capacitor 124, one end of which is connected across the emitter of the transistor 114, and the other end of which is connected via the dropping resistor 122 and the winding 98 to the collector of the transistor 114. The Zener diode 120 provides a degree of regulation, and the dropping resistor 122 has been suitably chosen so as to provide for dropping a portion of the 24 volts DC voltage appearing across the smoothing capacitor 124 thereby providing a correct magnitude of DC voltage to the collector of the transistor 114. Transistor switches 102, 108 and others not shown are energized similarly to the transistor switch 96.

A cassett, containing a suitable prerecorded program which takes into account current moisture and weather conditions, is positioned in the system as the source of a plurality of control signals 66. At a preselected time, for example 9:00 p.m., the 7-day clock 64 activates the source 66 thereby providing for an extended period of time, for example, throughout nighttime hours, for the prerecorded program from the source 66 to be fed via the transformer 68 so that the plurality of control signals from the source 66 appears across the conductors 50 and 74. The plurality of control signals are fed to transformers 76, 82, 88 and additional transformers not specifically illustrated for selectively energizing transistor switches 96, 102, 108, as well as other transistors which are not specifically illustrated. Each of the aforementioned transformers is provided with a tuned secondary winding which provides tuning of a parallel resonant circuit to a particular frequency of one of the control signals of the plurality of control signals provided from the source 66. Thus, the secondary winding 80 and the capacitor 94 provide a band pass filter for one of the plurality of control signals, for example, 330 c.p.s. while serving to reject all other frequencies selected for the remaining plurality of control signals.

In a similar manner, the secondary winding 86 and the capacitor 100, and the secondary winding 92 and the capacitor 106, provide band pass filters for signals of other selected frequencies. Additional parallel tuned secondary windings are similarly used to control additional transistor switches. Whenever the selected frequency appears across parallel resonant circuits 80—94, the transistor 114 is driven into conduction on alternate half cycles of the input, thereby providing for current flow to the relay winding 98 of the relay 58 causing the relay to become energized. The contacts 52 close completing a path for current through the heating resistor 36 thereby actuating the thermal-motor forming part of the electrically actuated valve 12.

So long as the 330 c.p.s. control signal appears across the secondary winding 80, the transistor switch 96 remains in a conductive condition, and the relay contacts 52 remain closed. The electrically actuated valve 12 is retained in an open condition so long as heating current is provided to the heating resistor 36, and water is allowed to pass through the electrically actuated valve 12 via the conduit system 18 to popup sprinklers 20. When the selected 330 c.p.s. signal no longer appears across the secondary winding 80, the transistor switch 96 becomes nonconductive, the relay 58 becomes deenergized and the contacts 52 open thereby interrupting current to the heating resistor 36 allowing the electrically actuated valve 12 to return slowly to a closed position. The relay contacts 54, 56 and others not illustrated are similarly opened and closed thereby selectively applying current to heating resistors 38, 40 and others not illustrated.

As can be seen from the foregoing, the various electrically actuated valves are selectively opened and closed in accordance with a prerecorded program comprising a plurality of control signals of preselected durations and of different frequencies from a source of recorded signals.

The operation of the alternative control circuit illustrated in FIG. 3 is similar to the operation of the control circuit illustrated in FIG. 2, and need not be discussed in detail. In the control circuit illustrated in FIG. 3, it is to be understood that the parallel resonant secondary windings 138, 142, 146, 150 and others not illustrated as well as the transistors and relays associated therewith are positioned remote from the electrically actuated valves to be controlled. Thus, in the modified version of the control circuit illustrated in FIG. 3, it is not necessary to provide a separate power supply for each of the transistors, and the emitter and collector voltages for the transistors are provided by a power supply having terminals 165 and 168.

While specific forms and arrangements shown and described hereinabove represent illustrative embodiments of the invention, it will be readily apparent to those skilled in the art that many variations and modifications may be made which are contemplated by the invention. While the illustrative embodiments have been described in connection with arrangements wherein a single frequency control signal actuates individual transistor switches, it is to be understood that in certain applications it may be desirable to provide for the simultaneous appearance of more than one control signal for actuating each transistor switch. In such arrangement, individual control signals could be passed via filters, rectified, and thereafter passed through AND gates to actuate individual switches. The transistor and relays may, in some applications, be replaced by silicon-controlled rectifiers. If necessary, an amplifier may be interposed between the source of control signals 66 and transformer 68. In some applications, the filtered control signals may be rectified before application to the emitter-base path of the transistors forming part of the transistor switches. While the illustrative embodiments show systems wherein the electrically actuated valves are actuated so that only one valve is on at any given time, it will be understood that in some applications more than one valve may be actuated at a given time if desired by either making more than one valve responsive to the same frequency control signal or coupling more than one control signal into the system simultaneously.

I claim:

1. A controlled fluid distribution system including a source of fluid, conduit means connected between said source of fluid and a plurality of electrically controlled valves each leading to one or more separate fluid outlets, a separate switching means for energizing each valve, and means for selectively actuating each of said switching means comprising means for providing a plurality of control signals each having a different frequency, separate frequency selective means coupled between each of said switching means and said means for providing a plurality of control signals for selectively actuating each of said separate switching means.

2. A distribution system according to claim 1 wherein said means for providing a plurality of control signals comprise a source of recorded signals each having a different frequency.

3. A distribution system according to claim 2 wherein said source of recorded signals comprise a replaceable recording upon which a program comprised of signals of different frequencies and selected time durations have been recorded whereby the recording may be replaced by others having a different program recorded thereon.

4. A distribution system according to claim 1 wherein said means for providing a plurality of control signals comprise a plurality of oscillators.

5. A distribution system according to claim 4 further including a timing device coupled to said plurality of oscillators.

6. A distribution system according to claim 1 further including a timing device coupled to said means for providing a plurality of control signals.

7. A distribution system according to claim 1 wherein said means for providing a plurality of control signals comprises a variable frequency oscillator which is provided with frequency sweeping means.

8. A distribution system according to claim 1 wherein each of said separate frequency selective means comprises at least one tuned filter for passing at least one frequency of said different frequencies.

9. A distribution system according to claim 1 wherein each of said separate frequency selective means and each of said separate switching means are positioned in proximity to respective valves and remote from said means for providing a plurality of control signals.

10. A distribution system according to claim 9 wherein a pair of conductors are used to couple each of said separate frequency selective means to said means for providing a plurality of control signals, and at least one of said pair of conductors is coupled between an electrical power source and each of said electrically controlled valves.

11. A distribution system according to claim 10 wherein said at least one of said pair of conductors is coupled between said electrical power source and each of said switching means.

12. A distribution system according to claim 1 wherein each of said switching means comprise a semiconductive electron discharge device.

13. A distribution system according to claim 9 wherein each of said separate frequency selective means is coupled to said means for providing a plurality of control signals via an electrical circuit also connected at least in part to supply electrical power to each of said electrically controlled valves.

14. A distribution system according to claim 13 wherein said electrical circuit is also connected at least in part to supply electrical power to each of said switching means.

15. A controlled water distribution irrigation system including a source of water, conduit means connected between said source of water and a plurality of electrically controlled valves each leading to one or more separate spaced water outlets, a separate switching means for energizing each valve, and means for selectively actuating each of said switching means comprising means for providing a plurality of control signals each having a different frequency, separate frequency selective means coupled between each of said switching means and said means for providing a plurality of control signals for selectively actuating each of said separate switching means.

16. A distribution system according to claim 1 wherein said means for providing a plurality of control signals comprise a variable frequency oscillator.

17. A distribution system according to claim 16 further including a timing device coupled to said variable frequency oscillator.